United States Patent
Liu et al.

(10) Patent No.: US 9,409,061 B2
(45) Date of Patent: Aug. 9, 2016

(54) THERMOPLASTIC MULTI-LAYER GOLF BALL

(71) Applicant: NIKE, Inc., Beaverton, OR (US)

(72) Inventors: Chen-Tai Liu, Yun-Lin Hsien (TW); Chien-Hsin Chou, Yun-Lin-Hsien (TW)

(73) Assignee: NIKE, Inc., Beaverton, OR (US)

( * ) Notice: Subject to any disclaimer, the term of this patent is extended or adjusted under 35 U.S.C. 154(b) by 93 days.

(21) Appl. No.: 14/061,202

(22) Filed: Oct. 23, 2013

(65) Prior Publication Data

US 2014/0357413 A1     Dec. 4, 2014

Related U.S. Application Data

(60) Provisional application No. 61/829,282, filed on May 31, 2013.

(51) Int. Cl.
*A63B 37/04*     (2006.01)
*A63B 37/00*     (2006.01)
(Continued)

(52) U.S. Cl.
CPC .......... *A63B 37/0075* (2013.01); *A63B 37/0024* (2013.01); *A63B 37/0033* (2013.01); *A63B 37/0035* (2013.01); *A63B 37/0037* (2013.01); *A63B 37/0049* (2013.01); *A63B 37/0051* (2013.01); *A63B 37/0064* (2013.01); *A63B 37/0066* (2013.01); *A63B 37/0069* (2013.01); *A63B 37/0082* (2013.01); *A63B 37/0086* (2013.01); *A63B 37/0091* (2013.01); *C08K 5/09* (2013.01); *A63B 37/0047* (2013.01); *C08L 75/04* (2013.01)

(58) Field of Classification Search
USPC .................................................. 473/351–378
See application file for complete search history.

(56) References Cited

U.S. PATENT DOCUMENTS

| | | | | |
|---|---|---|---|---|
| 4,839,116 A | * | 6/1989 | Puckett et al. | 264/45.3 |
| 5,482,285 A | * | 1/1996 | Yabuki | A63B 37/0003 473/373 |
| 5,779,563 A | * | 7/1998 | Yamagishi et al. | 473/371 |

(Continued)

FOREIGN PATENT DOCUMENTS

WO    2011112479 A1    9/2011
WO    2013028666 A2    2/2013

OTHER PUBLICATIONS

Written Opinion and International Search Report for PCT/US2014/038583 dated Oct. 7, 2014.
(Continued)

*Primary Examiner* — Alvin Hunter
(74) *Attorney, Agent, or Firm* — Honigman Miller Schwartz and Cohn LLP

(57) ABSTRACT

A golf ball has a relatively light core center. The golf ball may have a thermoplastic core center with diameter about 28-35 mm and flexural modulus under about 15,000 psi; a thermoplastic core layer with flexural modulus ≤about 15,000 psi and >the core center's flexural modulus; and a cover ≥about 2 mm thick with specific gravity ≥about 2 g/cm³ and flexural modulus ≥about 15,000 psi. Alternatively, the core center has diameter about 21-29 mm, flexural modulus <about 15,000 psi, and specific gravity ≤about 0.95 g/cm³; the core layer has specific gravity ≥about 1.1 g/cm³ and flexural modulus ≤about 15,000 psi and >the core center flexural modulus; and the cover is ≥about 1 mm thick, has specific gravity ≥about 1.1 g/cm³, and flexural modulus ≥about 15,000 psi.

15 Claims, 1 Drawing Sheet

(51) Int. Cl.
    *C08K 5/09*           (2006.01)
    *C08L 75/04*         (2006.01)

(56) References Cited

U.S. PATENT DOCUMENTS

| | | | |
|---|---|---|---|
| 6,010,412 A | 1/2000 | Moriyama | |
| 6,213,895 B1 * | 4/2001 | Sullivan et al. | 473/374 |
| 6,245,859 B1 * | 6/2001 | Sullivan et al. | 525/330.2 |
| 6,494,795 B2 * | 12/2002 | Sullivan | 473/372 |
| 6,565,457 B1 | 5/2003 | Sullivan et al. | |
| 6,780,126 B2 | 8/2004 | Ladd et al. | |
| 6,846,248 B2 * | 1/2005 | Nesbitt | 473/373 |
| 6,945,878 B2 * | 9/2005 | Binette et al. | 473/373 |
| 6,981,926 B2 * | 1/2006 | Sullivan et al. | 473/376 |
| 6,988,962 B2 * | 1/2006 | Sullivan et al. | 473/376 |
| 7,074,137 B2 * | 7/2006 | Sullivan et al. | 473/376 |
| 7,247,676 B2 * | 7/2007 | Morgan et al. | 525/99 |
| 7,320,649 B2 * | 1/2008 | Rajagopalan et al. | 473/374 |
| 7,468,006 B2 * | 12/2008 | Sullivan et al. | 473/376 |
| 7,651,415 B2 * | 1/2010 | Ladd et al. | 473/376 |
| 7,762,910 B2 * | 7/2010 | Sullivan et al. | 473/376 |
| 7,766,767 B2 * | 8/2010 | Sullivan et al. | 473/373 |
| 7,874,939 B2 | 1/2011 | Sullivan et al. | |
| 7,874,940 B2 * | 1/2011 | Kim et al. | 473/377 |
| 7,935,759 B2 * | 5/2011 | Sullivan et al. | 525/176 |
| 7,942,761 B2 * | 5/2011 | Sullivan et al. | 473/376 |
| 7,946,934 B2 * | 5/2011 | Sullivan et al. | 473/376 |
| 8,026,304 B2 * | 9/2011 | Rajagopalan et al. | 524/322 |
| 8,044,136 B2 * | 10/2011 | De Garavilla | 524/556 |
| 8,177,665 B2 | 5/2012 | Loper et al. | |
| 8,399,549 B2 * | 3/2013 | De Garavilla | 524/322 |
| 8,618,197 B2 * | 12/2013 | Sullivan et al. | 524/322 |
| 8,740,725 B2 * | 6/2014 | Sullivan et al. | 473/376 |
| 8,764,580 B2 * | 7/2014 | Ishii et al. | 473/368 |
| 8,784,238 B2 * | 7/2014 | Rajagopalan et al. | 473/377 |
| 8,939,850 B2 * | 1/2015 | Sullivan et al. | 473/376 |
| 8,939,851 B2 | 1/2015 | Hebert | |
| 2002/0155906 A1 | 10/2002 | Sullivan et al. | |
| 2003/0083156 A1 | 5/2003 | Pasqua et al. | |
| 2009/0181801 A1 * | 7/2009 | Sullivan | A63B 37/0003 473/376 |
| 2012/0309560 A1 | 12/2012 | Sullivan et al. | |

OTHER PUBLICATIONS

Corrected PCT Internation Preliminary Report on Patentability for PCT Application No. PCT/US2014/038583, original mail date Apr. 29, 2015, 15 pgs.

Supplementary European Search Report for EP Application No. 14804069 mailed May 20, 2016.

* cited by examiner

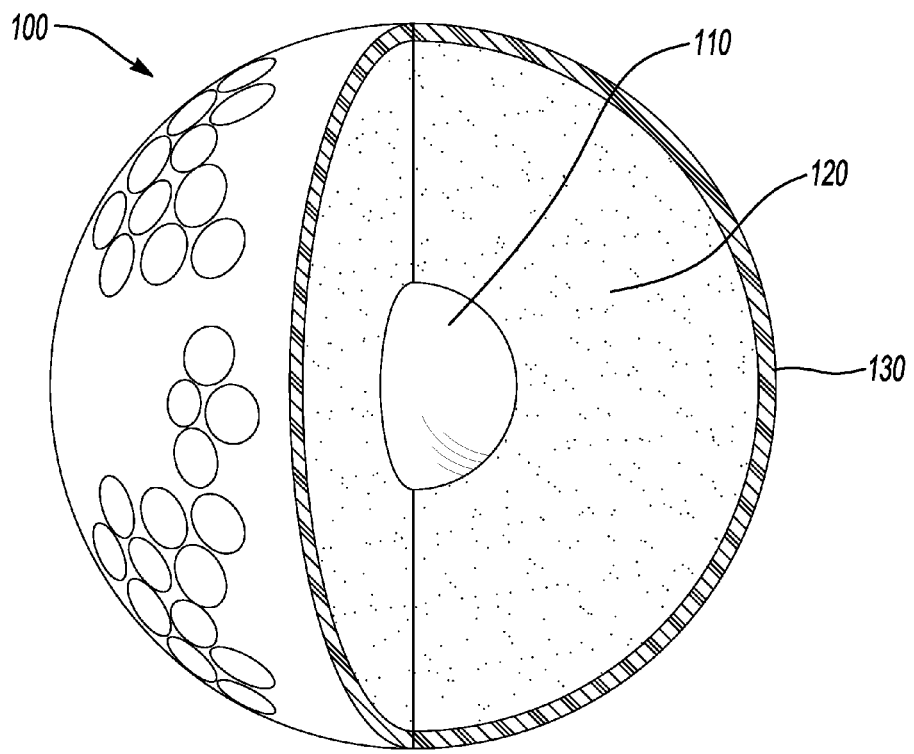

THERMOPLASTIC MULTI-LAYER GOLF BALL

FIELD OF THE INVENTION

The invention concerns multi-layer golf balls in which the layers have different flexural moduli.

BACKGROUND

This section provides information helpful in understanding the invention but that is not necessarily prior art.

Golf ball core and cover layers are typically constructed with polymer compositions including, for example, polybutadiene rubber, polyurethanes, polyamides, ionomers, and blends of such polymers. Ionomers, particularly ethylene-based ionomers, are a preferred group of polymers for golf ball layers because of their toughness, durability, and wide range of hardness values.

Golf ball compositions comprising highly neutralized acid polymers are known. For example, U.S. Pat. No. 7,375,151, the entire disclosure of which is incorporated herein by reference, discloses a highly-resilient thermoplastic ionomer resin composition comprising (a) melt-processable, ethylene acid copolymer; (b) aliphatic, mono-functional organic acid or its salt; (c) a thermoplastic resin; (d) a cation source; and (e) optionally, a filler. The ionomer resin may be neutralized to greater than 90% of all the acid groups present and remain melt-processable. The patent discloses using the highly-resilient thermoplastic composition in one-piece, two-piece, three-piece, and multi-layered golf balls.

Differences in flexural modulus between layers in a ball with a cured rubber core have been described in Loper et al., US Patent Application Publication No. 2012/0129630, for example. Weight distribution amongst the ball layers is described, for example, in U.S. Pat. Nos. 6,193,618, 5,823,889, 6,120,393, 6,142,887, and 5,984,806. Construction of a thermoplastic ball, in which all layers are thermoplastic, must provide good performance characteristics to compete with rubber-containing golf balls. While various uses for highly neutralized acid polymers in golf balls have been discovered, there is a need to improve golf ball characteristics when using combinations of thermoplastic polymers to provide golf ball constructions having desirable spin, feel, and COR properties.

SUMMARY OF THE DISCLOSURE

This section provides a general summary of the disclosure and is not comprehensive of its full scope or all of the disclosed features.

The technology now disclosed provides thermoplastic golf balls with relatively light core centers. In a first embodiment, the golf ball has a core center with a diameter from about 28 mm to about 35 mm including a thermoplastic material having a flexural modulus of less than about 15,000 psi; a core layer radially outward from the core center that has a thermoplastic material with a flexural modulus of up to about 15,000 psi and that is greater than the flexural modulus of the core center's thermoplastic material; and a cover at least about 2 mm thick that has a specific gravity of at least about 2 $g/cm^3$ and includes a thermoplastic material having a flexural modulus of at least about 15,000 psi, with the cover forming an outermost structural layer of the ball.

In a second embodiment, a golf ball has a core center having a diameter from about 21 mm to about 29 mm including a thermoplastic material having a flexural modulus of less than about 15,000 psi and a specific gravity of up to about 0.95 $g/cm^3$; a core layer radially outward from the core center that has a specific gravity of at least about 1.1 $g/cm^3$ and including a thermoplastic material with a flexural modulus of up to about 15,000 psi and that is greater than the flexural modulus of the core center's thermoplastic material; and a cover that has a thickness of at least about 1 mm, a specific gravity of at least about 1.1 $g/cm^3$, and that includes a third thermoplastic material having a third flexural modulus of at least about 15,000 psi.

In these embodiments, the core center may be foamed or may include a lightweight filler such as hollow glass or plastic particles or beads or foamed particles or beads.

The ball preferably is fully thermoplastic and is free from a rubber thermoset layer.

The golf ball has a multi-layer core including a core center as an innermost core part and one or more "core layers" outward from and enclosing the center. A "core layer" for this invention is a golf ball layer lying between the center and the cover of the golf ball. In describing this invention, a "cover" is the outermost structural golf ball layer of the ball or, for two cover layers, each "cover layer" is one of the two outermost structural golf ball layers. Coating layers (whether paint layers or clear coating layers) are not considered to be structural layers.

Flexural modulus is measured according to ASTM D790. Specific gravity is measured according to ASTM D792. "Coefficient of restitution" or COR in the present invention is measured generally according to the following procedure: a golf ball is fired by an air cannon at an initial velocity of 40 msec, and a speed monitoring device is located over a distance of 0.6 to 0.9 meters from the cannon. After striking a steel plate positioned about 1.2 meters away from the air cannon, the test object rebounds through the speed-monitoring device. The return velocity divided by the initial velocity is the COR.

"A," "an," "the," "at least one," and "one or more" are used interchangeably to indicate that at least one of the item is present; the indefinite articles indicate a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiments. In this description of the invention, for convenience, "polymer" and "resin" are used interchangeably to encompass resins, oligomers, and polymers. The terms "comprises," "comprising," "including," and "having," are inclusive and therefore specify the presence of stated items, but do not preclude the presence of other items. As used in this specification, the term "or" includes any and all combinations of one or more of the listed items. When the terms first, second, third, etc. are used to differentiate various items from each other, these designations are merely for convenience and do not limit the items.

BRIEF DESCRIPTION OF THE DRAWINGS

The FIGURE is a partial cross-sectional view of an embodiment of a multi-layer golf ball that illustrates some aspects of the disclosed technology. The parts of the FIGURE are not necessarily to scale.

DETAILED DESCRIPTION

A detailed description of exemplary, nonlimiting embodiments follows.

As shown in the FIGURE, a multi-layer golf ball 100 has a core center 110, a core layer 120 that is radially outward from the core center 110, and a cover 130 that forms the outermost layer of the golf ball 100. Each of the core center, the core layer, and the cover includes a thermoplastic material.

The disclosed golf ball has a multi-layer core that includes at least a core center including a first thermoplastic material, a core layer radially outward from the core center including a second thermoplastic material, and a cover including a third thermoplastic material.

Each of the first, second, and third thermoplastic materials may include at least one thermoplastic elastomer. Each of the first, second, and third thermoplastic materials may also include one or more non-elastomeric polymers, plasticizers, fillers, and customary additives.

The first, second, and third thermoplastic materials each independently generally includes at least one thermoplastic elastomer. Nonlimiting examples of suitable thermoplastic elastomers that can be used in making the golf ball core and cover include metal cation ionomers of addition copolymers ("ionomer resins"), metallocene-catalyzed block copolymers of ethylene and α-olefins having 4 to about 8 carbon atoms, thermoplastic polyamide elastomers (e.g., polyether block polyamides), thermoplastic polyester elastomers, thermoplastic styrene block copolymer elastomers such as poly(styrene-butadiene-styrene), poly(styrene-ethylene-co-butylene-styrene), and poly(styrene-isoprene-styrene), thermoplastic polyurethane elastomers, thermoplastic polyurea elastomers, and dynamic vulcanizates of rubbers in these thermoplastic elastomers and in other thermoplastic matrix polymers.

Ionomer resins, which are metal cation ionomers of addition copolymers of ethylenically unsaturated acids, are preferably alpha-olefin, particularly ethylene, copolymers with $C_3$ to $C_8$ α,β-ethylenically unsaturated carboxylic acids, particularly acrylic or methacrylic acid. The copolymers may also contain a softening monomer such as an alkyl acrylate or methacrylate, for example a $C_1$ to $C_8$ alkyl acrylate or methacrylate ester. The α,β-ethylenically unsaturated carboxylic acid monomer may be from about 4 weight percent or about 6 weight percent or about 8 weight percent up to about 20 weight percent or up to about 35 weight percent of the copolymer, and the softening monomer, when present, is preferably present in a finite amount, preferably at least about 5 weight percent or at least about 11 weight percent, up to about 23 weight percent or up to about 25 weight percent or up to about 50 weight percent of the copolymer.

Nonlimiting specific examples of acid-containing ethylene copolymers include copolymers of ethylene/acrylic acid/n-butyl acrylate, ethylene/methacrylic acid/n-butyl acrylate, ethylene/methacrylic acid/isobutyl acrylate, ethylene/acrylic acid/isobutyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include copolymers of ethylene/methacrylic acid/n-butyl acrylate, ethylene/acrylic acid/n-butyl acrylate, ethylene/methacrylic acid/methyl acrylate, ethylene/acrylic acid/ethyl acrylate, ethylene/methacrylic acid/ethyl acrylate, and ethylene/acrylic acid/methyl acrylate. In various embodiments the most preferred acid-containing ethylene copolymers include ethylene/(meth)acrylic acid/n-butyl acrylate, ethylene/(meth)acrylic acid/ethyl acrylate, and ethylene/(meth)acrylic acid/methyl acrylate copolymers.

The ionomer resin may be a high acid ionomer resin. In general, ionomers prepared by neutralizing acid copolymers including at least about 16 weight % of copolymerized acid residues based on the total weight of the unneutralized ethylene acid copolymer are considered "high acid" ionomers. In these high modulus ionomers, the acid monomer, particularly acrylic or methacrylic acid, is present in about 16 to about 35 weight %. In various embodiments, the copolymerized carboxylic acid may be from about 16 weight %, or about 17 weight % or about 18.5 weight % or about 20 weight % up to about 21.5 weight % or up to about 25 weight % or up to about 30 weight % or up to about 35 weight % of the unneutralized copolymer. A high acid ionomer may be combined with a "low acid" ionomer in which the copolymerized carboxylic acid is less than 16 weight % of the unneutralized copolymer. Such a mixture of a high acid ionomer and a low acid ionomer is particularly suitable for the third thermoplastic material of the inner cover layer or the fourth thermoplastic material or the outer cover layer, and especially for the third thermoplastic material of the inner cover layer.

The acid moiety in the ethylene-acid copolymer is neutralized by any metal cation. Suitable preferred cations include lithium, sodium, potassium, magnesium, calcium, barium, lead, tin, zinc, aluminum, or a combination of these cations; in various embodiments alkali metal, alkaline earth metal, or zinc cations are particularly preferred. In various embodiments, the acid groups of the ionomer may be neutralized from about 10% or from about 20% or from about 30% or from about 40% to about 60% or to about 70% or to about 75% or to about 80% or to about 90%.

A sufficiently high molecular weight, monomeric organic acid or salt of such an organic acid may be added to the acid copolymer or ionomer so that the acid copolymer or ionomer can be neutralized, without losing processability, to a level above the level that would cause the ionomer alone to become non-melt-processable. The high-molecular weight, monomeric organic acid its salt may be added to the ethylene-unsaturated acid copolymers before they are neutralized or after they are optionally partially neutralized to a level between about 1 and about 100%, provided that the level of neutralization is such that the resulting ionomer remains melt-processable. In generally, when the high-molecular weight, monomeric organic acid is included the acid groups of the copolymer may be neutralized from at least about 40 to about 100%, preferably from at least about 90% to about 100%, and most preferably 100% without losing processability. Such high neutralization, particularly to levels greater than 80%, greater than 90% or greater than 95% or most preferably 100%, without loss of processability can be done by (a) melt-blending the ethylene α,β-ethylenically unsaturated carboxylic acid copolymer or a melt-processable salt of the copolymer with an organic acid or a salt of organic acid, and (b) adding a sufficient amount of a cation source up to 110% of the amount needed to neutralize the total acid in the copolymer or ionomer and organic acid or salt to the desired level to increase the level of neutralization of all the acid moieties in the mixture preferably to greater than 90%, preferably greater than 95%, or preferably to 100%. To obtain 100% neutralization, it is preferred to add a slight excess of up to 110% of cation source over the amount stoichiometrically required to obtain the 100% neutralization.

The high molecular weight, monomeric saturated or unsaturated acid may have from 8 or 12 or 18 carbon atoms to 36 carbon atoms or to less than 36 carbon atoms. Nonlimiting suitable examples of the high-molecular weight, monomeric saturated or unsaturated organic acids include stearic, behenic, erucic, oleic, and linoleic acids and their salts, particularly the barium, lithium, sodium, zinc, bismuth, chromium, cobalt, copper, potassium, strontium, titanium, tungsten, magnesium, or calcium salts of these fatty acids. These may be used in combinations.

Thermoplastic polyolefin elastomers may also be used in the thermoplastic materials of the golf ball. These are metallocene-catalyzed block copolymers of ethylene and α-olefins having 4 to about 8 carbon atoms that are prepared by single-site metallocene catalysis, for example in a high pressure process in the presence of a catalyst system comprising a cyclopentadienyl-transition metal compound and an alumoxane. Nonlimiting examples of the α-olefin softening comonomer include hexane-1 or octene-1; octene-1 is a preferred comonomer to use. These materials are commercially available, for example, from ExxonMobil under the tradename Exact™ and from the Dow Chemical Company under the tradename Engage™.

Suitable thermoplastic styrene block copolymer elastomers that may be used in the thermoplastic materials of the golf ball include poly(styrene-butadiene-styrene), poly(styrene-ethylene-co-butylene-styrene), poly(styrene-isoprene-styrene), and poly(styrene-ethylene-co-propylene) copolymers. These styrenic block copolymers may be prepared by living anionic polymerization with sequential addition of styrene and the diene forming the soft block, for example using butyl lithium as initiator. Thermoplastic styrene block copolymer elastomers are commercially available, for example, under the trademark Kraton™ sold by Kraton Polymers U.S. LLC, Houston, Tex. Other such elastomers may be made as block copolymers by using other polymerizable, hard, non-rubber monomers in place of the styrene, including meth(acrylate) esters such as methyl methacrylate and cyclohexyl methacrylate, and other vinyl arylenes, such as alkyl styrenes.

Thermoplastic polyurethane elastomers such as thermoplastic polyester-polyurethanes, polyether-polyurethanes, and polycarbonate-polyurethanes may be used in the thermoplastic materials, particularly in the third thermoplastic material for the cover. The thermoplastic polyurethane elastomers include polyurethanes polymerized using as polymeric diol reactants polyethers and polyesters including polycaprolactone polyesters. These polymeric diol-based polyurethanes are prepared by reaction of the polymeric diol (polyester diol, polyether diol, polycaprolactone diol, polytetrahydrofuran diol, or polycarbonate diol), one or more polyisocyanates, and, optionally, one or more chain extension compounds. Chain extension compounds, as the term is being used, are compounds having two or more functional groups reactive with isocyanate groups, such as the diols, amino alcohols, and diamines. Preferably the polymeric diol-based polyurethane is substantially linear (i.e., substantially all of the reactants are difunctional).

Diisocyanates used in making the polyurethane elastomers may be aromatic or aliphatic. Useful diisocyanate compounds used to prepare thermoplastic polyurethanes include, without limitation, isophorone diisocyanate (IPDI), methylene bis-4-cyclohexyl isocyanate ($H_{12}$MDI), cyclohexyl diisocyanate (CHDI), m-tetramethyl xylene diisocyanate (m-TMXDI), p-tetramethyl xylene diisocyanate (p-TMXDI), 4,4'-methylene diphenyl diisocyanate (MDI, also known as 4,4'-diphenylmethane diisocyanate), 2,4- or 2,6-toluene diisocyanate (TDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, meta-xylylenediioscyanate and para-xylylenediisocyanate (XDI), 4-chloro-1,3-phenylene diisocyanate, 1,5-tetrahydro-naphthalene diisocyanate, 4,4'-dibenzyl diisocyanate, and combinations of these. Nonlimiting examples of higher-functionality polyisocyanates that may be used in limited amounts to produce branched thermoplastic polyurethanes (optionally along with monofunctional alcohols or monofunctional isocyanates) include 1,2,4-benzene triisocyanate, 1,3,6-hexamethylene triisocyanate, 1,6,11-undecane triisocyanate, bicycloheptane triisocyanate, triphenylmethane-4,4',4"-triisocyanate, isocyanurates of diisocyanates, biurets of diisocyanates, allophanates of diisocyanates, and the like.

Nonlimiting examples of suitable diols that may be used as extenders include ethylene glycol and lower oligomers of ethylene glycol including diethylene glycol, triethylene glycol, and tetraethylene glycol; propylene glycol and lower oligomers of propylene glycol including dipropylene glycol, tripropylene glycol, and tetrapropylene glycol; cyclohexanedimethanol, 1,6-hexanediol, 2-ethyl-1,6-hexanediol, 1,4-butanediol, 2,3-butanediol, 1,5-pentanediol, 1,3-propanediol, butylene glycol, neopentyl glycol, dihydroxyalkylated aromatic compounds such as the bis(2-hydroxyethyl) ethers of hydroquinone and resorcinol; p-xylene-α,α'-diol; the bis(2-hydroxyethyl) ether of p-xylene-α,α'-diol; m-xylene-α,α'-diol, and combinations of these. Other active hydrogen-containing chain extenders that contain at least two active hydrogen groups may be used, for example, dithiols, diamines, or compounds having a mixture of hydroxyl, thiol, and amine groups, such as alkanolamines, aminoalkyl mercaptans, and hydroxyalkyl mercaptans, among others. Suitable diamine extenders include, without limitation, ethylene diamine, diethylene triamine, triethylene tetraamine, and combinations of these. Other typical chain extenders are amino alcohols such as ethanolamine, propanolamine, butanolamine, and combinations of these. The molecular weights of the chain extenders preferably range from about 60 to about 400. Alcohols and amines are preferred.

In addition to difunctional extenders, a small amount of a trifunctional extender such as trimethylolpropane, 1,2,6-hexanetriol and glycerol, or monofunctional active hydrogen compounds such as butanol or dimethylamine, may also be included. The amount of trifunctional extender or monofunctional compound employed may be, for example, 5.0 equivalent percent or less based on the total weight of the reaction product and active hydrogen containing groups used.

The polyester diols used in forming a thermoplastic polyurethane elastomer are in general prepared by the condensation polymerization of one or more polyacid compounds and one or more polyol compounds. Preferably, the polyacid compounds and polyol compounds are di-functional, i.e., diacid compounds and diols are used to prepare substantially linear polyester diols, although minor amounts of mono-functional, tri-functional, and higher functionality materials can be included to provide a slightly branched, but uncrosslinked polyester polyol component. Suitable dicarboxylic acids include, without limitation, glutaric acid, succinic acid, malonic acid, oxalic acid, phthalic acid, isophthalic acid, hexahydrophthalic acid, adipic acid, maleic acid, suberic acid, azelaic acid, dodecanedioic acid, their anhydrides and polymerizable esters (e.g., methyl esters) and acid halides (e.g., acid chlorides), and mixtures of these. Suitable polyols include those already mentioned, especially the diols. Typical catalysts for the esterification polymerization are protonic acids, Lewis acids, titanium alkoxides, and dialkyltin oxides.

A polymeric polyether or polycaprolactone diol reactant for preparing thermoplastic polyurethane elastomers may be obtained by reacting a diol initiator, e.g., 1,3-propanediol or ethylene or propylene glycol, with a lactone or alkylene oxide chain-extension reagent. Lactones that can be ring opened by an active hydrogen are well-known in the art. Examples of suitable lactones include, without limitation, ε-caprolactone, γ-caprolactone, β-butyrolactone, β-propriolactone, γ-butyrolactone, α-methyl-γ-butyrolactone, β-methyl-γ-butyrolactone, γ-valerolactone, δ-valerolactone, γ-decanolactone, δ-decanolactone, γ-nonanoic lactone, γ-octanoic lactone, and combinations of these. In one preferred embodiment, the lactone is ε-caprolactone. Useful catalysts include those mentioned above for polyester synthesis. Alternatively, the reaction can be initiated by forming a sodium salt of the hydroxyl group on the molecules that will react with the lactone ring. In other embodiments, a diol initiator may be reacted with an oxirane-containing compound or cyclic ether to produce a polyether diol to be used in the polyurethane elastomer polymerization. Alkylene oxide polymer segments include, without limitation, the polymerization products of ethylene oxide, propylene oxide, 1,2-cyclohexene oxide, 1-butene oxide, 2-butene oxide, 1-hexene oxide, tert-butylethylene oxide, phenyl glycidyl ether, 1-decene oxide, isobutylene oxide, cyclopentene oxide, 1-pentene oxide, and combinations of these. The oxirane- or cyclic ether-containing compound is preferably selected from ethylene oxide, propylene oxide, butylene oxide, tetrahydrofuran, and combinations of these. The alkylene oxide polymerization is typically base-catalyzed. The polymerization may be carried out, for example, by charging the hydroxyl-functional initiator compound and a catalytic amount of caustic, such as potassium hydroxide, sodium methoxide, or potassium tert-butoxide, and adding the alkylene oxide at a sufficient rate to keep the monomer available for reaction. Two or more different alkylene oxide monomers may be randomly copolymerized by coincidental addition or polymerized in blocks by sequential addition. Homopolymers or copolymers of ethylene oxide or propylene oxide are preferred. Tetrahydrofuran may be polymerized by a cationic ring-opening reaction using such counterions as $SbF_6^-$, $AsF_6^-$, $PF_6^-$, $SbCl_6^-$, $BF_4^-$, $CF_3SO_3^-$, $FSO_3^-$, and $ClO_4^-$. Initiation is by formation of a tertiary oxonium ion. The polytetrahydrofuran segment can be prepared as a "living polymer" and terminated by reaction with the hydroxyl group of a diol such as any of those mentioned above. Polytetrahydrofuran is also known as polytetramethylene ether glycol (PTMEG).

Aliphatic polycarbonate diols that may be used in making a thermoplastic polyurethane elastomer may be prepared by the reaction of diols with dialkyl carbonates (such as diethyl carbonate), diphenyl carbonate, or dioxolanones (such as cyclic carbonates having five- and six-member rings) in the presence of catalysts like alkali metal, tin catalysts, or titanium compounds. Useful diols include, without limitation, any of those already mentioned. Aromatic polycarbonates are usually prepared from reaction of bisphenols, e.g., bisphenol A, with phosgene or diphenyl carbonate.

In various embodiments, the polymeric diol preferably has a weight average molecular weight of at least about 500, more preferably at least about 1000, and even more preferably at least about 1800 and a weight average molecular weight of up to about 10,000, but polymeric diols having weight average molecular weights of up to about 5000, especially up to about 4000, may also be preferred. The polymeric diol advantageously has a weight average molecular weight in the range from about 500 to about 10,000, preferably from about 1000 to about 5000, and more preferably from about 1500 to about 4000. The weight average molecular weights may be determined by ASTM D4274.

The reaction of the polyisocyanate, polymeric diol, and diol or other chain extension agent is typically carried out at an elevated temperature in the presence of a catalyst. Typical catalysts for this reaction include organotin catalysts such as stannous octoate, dibutyl tin dilaurate, dibutyl tin diacetate, dibutyl tin oxide, tertiary amines, zinc salts, and manganese salts. Generally, for elastomeric polyurethanes, the ratio of polymeric diol, such as polyester diol, to extender can be varied within a relatively wide range depending largely on the desired flexural modulus of the final polyurethane elastomer. For example, the equivalent proportion of polyester diol to extender may be within the range of 1:0 to 1:12 and, more preferably, from 1:1 to 1:8. Preferably, the diisocyanate(s) employed are proportioned such that the overall ratio of equivalents of isocyanate to equivalents of active hydrogen containing materials is within the range of 1:1 to 1:1.05, and more preferably, 1:1 to 1:1.02. The polymeric diol segments typically are from about 35% to about 65% by weight of the polyurethane polymer, and preferably from about 35% to about 50% by weight of the polyurethane polymer.

Suitable thermoplastic polyurea elastomers may be prepared by reaction of one or more polymeric diamines or polyols with one or more of the polyisocyanates already mentioned and one or more diamine extenders. Nonlimiting examples of suitable diamine extenders include ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), N-(3-aminopropyl)-N-methyl-1,3-propanediamine), 1,4-bis(3-aminopropoxy)butane, diethyleneglycol-di(aminopropyl)ether), 1-methyl-2,6-diamino-cyclohexane, 1,4-diamino-cyclohexane, 1,3- or 1,4-bis(methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, N,N'-dialkylamino-dicyclohexylmethane, and 3,3'-diethyl-5,5'-dimethyl-4,4'-diamino-dicyclohexylmethane. Polymeric diamines include polyoxyethylene diamines, polyoxypropylene diamines, poly(oxyethylene-oxypropylene) diamines, and poly(tetramethylene ether) diamines. The amine- and hydroxyl-functional extenders already mentioned may be used as well. Generally, as before, trifunctional reactants are limited and may be used in conjunction with monofunctional reactants to prevent crosslinking.

Suitable thermoplastic polyamide elastomers may be obtained by: (1) polycondensation of (a) a dicarboxylic acid, such as oxalic acid, adipic acid, sebacic acid, terephthalic acid, isophthalic acid, 1,4-cyclohexanedicarboxylic acid, or any of the other dicarboxylic acids already mentioned with (b) a diamine, such as ethylenediamine, tetramethylenediamine, pentamethylenediamine, hexamethylenediamine, or decamethylenediamine, 1,4-cyclohexanediamine, m-xylylenediamine, or any of the other diamines already mentioned; (2) a ring-opening polymerization of a cyclic lactam, such as ε-caprolactam or ω-laurolactam; (3) polycondensation of an aminocarboxylic acid, such as 6-aminocaproic acid, 9-aminononanoic acid, 11-aminoundecanoic acid, or 12-aminododecanoic acid; or (4) copolymerization of a cyclic lactam with a dicarboxylic acid and a diamine to prepare a carboxylic acid-functional polyamide block, followed by reaction with a polymeric ether diol (polyoxyalkylene glycol) such as any of those already mentioned. Polymerization may be carried out, for example, at temperatures of from about 180° C. to about 300° C. Specific examples of suitable polyamide block copolymers include NYLON 6, NYLON 66, NYLON 610, NYLON 11, NYLON 12, copolymerized NYLON MXD6, and NYLON 46 based elastomers. Thermoplastic poly(ether amide) block copolymer elastomers (PEBA) are commercially available under the trademark Pebax® from Arkema.

Thermoplastic polyester elastomers have blocks of monomer units with low chain length that form the crystalline regions and blocks of softening segments with monomer units having relatively higher chain lengths. Thermoplastic polyester elastomers are commercially available under the trademark Hytrel® from DuPont.

The thermoplastic materials of the golf ball may include combinations of thermoplastic elastomers. In one embodiment, a thermoplastic material includes a combination of a metal ionomer of a copolymer of ethylene and at least one of acrylic acid and methacrylic acid, a metallocene-catalyzed copolymer of ethylene and an α-olefin having 4 to about 8 carbon atoms, and a metal salt of an unsaturated fatty acid. This material may be prepared as described in Statz et al., U.S. Pat. No. 7,375,151 or as described in Kennedy, "Process for Making Thermoplastic Golf Ball Material and Golf Ball with Thermoplastic Material, U.S. patent application Ser. No. 13/825,112, filed 15 Mar. 2013, the entire contents of both being incorporated herein by reference.

In various embodiments, the first thermoplastic material includes an ionomer resin and a polyolefin elastomer. In various embodiments, at least one of the first thermoplastic material, the second thermoplastic material, and the third thermoplastic material includes a polymer selected from ionomer resins, polyamide elastomers, polyurethane elastomers, thermoplastic polyester elastomers, and combinations of these.

The thermoplastic materials may include other polymers. In one example, the first or second thermoplastic material may include dispersed domains of cured rubbers, which may be incorporated in a thermoplastic elastomer matrix via dynamic vulcanization of rubbers in any of these thermoplastic elastomers or in other thermoplastic polymers. One such composition is described in Voorheis et al, U.S. Pat. No. 7,148,279, which is incorporated herein by reference. In various embodiments, the first thermoplastic material may include a thermoplastic dynamic vulcanizate of a rubber in a non-elastomeric matrix resin such as polypropylene. Thermoplastic vulcanizates commercially available from ExxonMobil under the tradename Santoprene™ are believed to be vulcanized domains of EPDM in polypropylene.

Depending on the elastomer selected for each thermoplastic material, one or more plasticizers may be incorporated. One example of such a plasticizer is the high molecular weight, monomeric organic acid or its salt that may be incorporated, for example, with an ionomer polymer as already described, including metal stearates such as zinc stearate, calcium stearate, barium stearate, lithium stearate and magnesium stearate. For most thermoplastic elastomers, the percentage of hard-to-soft segments is adjusted if lower hardness is desired rather than by adding a plasticizer.

The second thermoplastic material's flexural modulus is greater than the first thermoplastic material's flexural modulus. The second thermoplastic material's flexural modulus is up to about 15,000 psi and the first thermoplastic material's flexural modulus is less than about 15,000 psi, preferably up to about 10,000 psi, and less than the second thermoplastic material's flexural modulus. In certain preferred embodiments, the first flexural modulus is from about 1,000 psi to less than about 15,000 psi, more preferably from about 3000 psi to about 6000 psi and the second flexural modulus is from about 1,000 psi to about 15,000 psi, more preferably from about 6000 psi to about 12,000 psi.

Nonlimiting examples of thermoplastic polymers that may be used that have a flexural modulus up to about 15,000 are the grades of ionomer resins sold by DuPont Company, Wilmington Del. under the name Surlyn® 6320, 8020, 8120, 8320, 9020, 9320, and 9320W, and DuPont's HPF2000 and HPF AD1035 ionomer resins; polyolefin elastomers such as Engage™ 8180; thermoplastic polyester polyurethanes and thermoplastic polyether polyurethanes, including G35D50N and G38D50N, sold by Hwa Pao Resins Chemical Co. Ltd. The thermoplastic polymers may be mixed with an amount of filler or other polymers that results in the flexural modulus of the thermoplastic material having the desired value for flexural modulus.

The polymers and the type and amount of any filler of each of the first, second, and third thermoplastic materials are selected and apportioned so that the flexural moduli and specific gravities have a desired relationship.

The third thermoplastic material has a third flexural modulus of at least about 15,000 psi. In other embodiments, the third flexural modulus may be at least about 35,000 psi. In various embodiments, the cover has a specific gravity of from about 2.0 g/cm$^3$ to about 3.0 g/cm$^3$, preferably from about 2.0 g/cm$^3$ to about 2.5 g/cm$^3$.

The third thermoplastic material may include a filler to increase the third flexural modulus. Preferably, the third thermoplastic material includes a metal or metal compound such as a metal oxide. Nonlimiting examples of heavy-weight fillers that may be used to increase specific gravity include titanium, tungsten, aluminum, bismuth, nickel, molybdenum, iron, steel, lead, copper, brass, boron, boron carbide whiskers, bronze, cobalt, beryllium, zinc, tin, and metal oxides (such as zinc oxide, iron oxide, aluminum oxide, titanium oxide, magnesium oxide, zirconium oxide).

Various fillers may be included in the first and second thermoplastic materials, and the filler may also be selected to modify the specific gravity, hardness, or other properties of the thermoplastic material. Nonlimiting examples of suitable fillers include clay, talc, asbestos, graphite, glass, mica, calcium metasilicate, barium sulfate, zinc sulfide, aluminum hydroxide, silicates, diatomaceous earth, carbonates (such as calcium carbonate, magnesium carbonate and the like), metals (such as titanium, tungsten, aluminum, bismuth, nickel, molybdenum, iron, copper, brass, boron, bronze, cobalt, beryllium and alloys of these), metal oxides (such as zinc oxide, iron oxide, aluminum oxide, titanium oxide, magnesium oxide, zirconium oxide and the like), particulate synthetic plastics (such as high molecular weight polyethylene, polystyrene, polyethylene ionomeric resins and the like), particulate carbonaceous materials (such as carbon black, natural bitumen and the like), as well as cotton flock, cellulose flock and/or leather fiber. In particular, the first thermoplastic material may include a light-weight filler. Nonlimiting examples of light-weight fillers that may be used to decrease specific gravity include particulate plastics, glass, ceramics, and hollow spheres, regrinds, or foams of these. Fillers that may be used in the core center and core layers of a golf ball are typically in a finely divided form.

The cover may be formulated with a pigment, such as a yellow or white pigment, and in particular a white pigment such as titanium dioxide or zinc oxide. Generally titanium dioxide is used as a white pigment, for example in amounts of from about 0.5 parts by weight or 1 part by weight to about 8 parts by weight or 10 parts by weight based on 100 parts by weight of polymer. In various embodiments, a white-colored cover may be tinted with a small amount of blue pigment or brightener.

In other embodiments, each of the core layer and the cover independently has a specific gravity of at least about 1.1 $g/cm^3$, preferably from about 1.1 $g/cm^3$ to about 1.8 $g/cm^3$. These specific gravities may be obtained by incorporating one or more fillers, preferably one or more heavy-weight fillers such as those already mentioned. When each of the core layer and the cover independently has a specific gravity of at least about 1.1 $g/cm^3$, the core center has a specific gravity of up to about 0.95 $g/cm^3$. The first thermoplastic material making up the core center may be foamed or include lightweight fillers. Nonlimiting examples of light-weight fillers that may be used to decrease specific gravity include particulate plastics, glass, ceramics, and hollow spheres, regrinds, or foams. The first thermoplastic material can be foamed using techniques well-known in the art. In one method, a chemical or mechanical blowing agent is incorporated into the first thermoplastic material, causing the first thermoplastic material to foam when it is molded into the core center. Suitable examples of blowing agents that may be used include 2,2'-azo-bis(isobutyronitrile), azodicarbonamide, 4,4'-oxy-bis (benzenesulfonyl hydrazide) and dinitrosopentamethylenetetramine. In another method, the first thermoplastic material is infused with a supercritical fluid in a pressurized container, then rapidly depressurized and heated either by immersion in a heated fluid that can rapidly heat the article or with infrared or microwave radiation to heat and foam the first thermoplastic material. Nonlimiting examples of suitable compounds that can be used as the supercritical fluid include carbon dioxide (critical temperature 31.1° C., critical pressure 7.38 MPa), nitrous oxide (critical temperature 36.5° C., critical pressure 7.24 MPa), ethane (critical temperature 32.3° C., critical pressure 4.88 MPa), ethylene (critical temperature 9.3° C., critical pressure 5.12 MPa), nitrogen (critical temperature −147° C., critical pressure 3.39 MPa), oxygen (critical temperature −118.6° C., critical pressure 5.08 MPa), ammonia (critical temperature 132.5° C., critical pressure 11.28 MPa), and water (critical temperature 374.2° C., critical pressure 22.12 psi). Supercritical carbon dioxide is one particularly preferred supercritical fluid. The article of first thermoplastic material that is foamed may be an elastomeric material in the general shape of the core center when it is infused with the supercritical fluid so that foaming results in the formed foam core center. The core center may also be made with foamed thermoplastic particles or beads, which may be made by such methods, molded in a thermoplastic matrix.

Customary additives can also be included in the thermoplastic materials, for example dispersants, antioxidants such as phenols, phosphites, and hydrazides, processing aids, surfactants, stabilizers, and so on. The cover may also contain additives such as hindered amine light stabilizers such as piperidines and oxanalides, ultraviolet light absorbers such as benzotriazoles, triazines, and hindered phenols, fluorescent materials and fluorescent brighteners, dyes such as blue dye, and antistatic agents.

The thermoplastic materials may be made by conventional methods, such as melt mixing in a single- or twin-screw extruder, a Banbury mixer, an internal mixer, a two-roll mill, or a ribbon mixer. The first thermoplastic material is formed into a core center and the second thermoplastic material is formed into a core layer around the core center by usual methods, for example by injection molding with a mold temperature in the range of 150° C. to 230° C. If there is a second core layer, the fourth thermoplastic material may be formed in a layer over the core layer by the same methods. The molded core including core center, core layer, and optionally second core layer or further core layers, may be ground to a desired diameter after cooling. Grinding can also be used to remove flash, pin marks, and gate marks due to the molding process.

In some embodiments, particularly when the cover has a specific gravity of at least about 2 $g/cm^3$, the core center has a diameter of from about 28 mm to about 35 mm and preferably from about 30 mm to about 34 mm. In other embodiments, particularly when the core layer and the cover each have a specific gravity of at least about 1.1 $g/cm^3$, the core center has a diameter of from about 21 mm to about 29 mm, and preferably from about 23 mm to about 27 mm.

The core layer may have a thickness of at least about 4 mm. In certain preferred embodiments, the core layer has a thickness of at least about 5 mm. In various embodiments, the core layer may have a thickness of from about 4 mm to about 8 mm.

A cover layer is molded over the core. In various embodiments, the third thermoplastic material used to make the cover may preferably include one or more of thermoplastic polyurethane elastomers, thermoplastic polyurea elastomers, and the metal cation salts of copolymers of ethylene with ethylenically unsaturated carboxylic acids.

The cover may be formed on the multi-layer core by injection molding, compression molding, casting, and so on. For example, when the cover is formed by injection molding, a core fabricated beforehand may be set inside a mold, and the cover material may be injected into the mold. The cover is typically molded on the core by injection molding or compression molding. Alternatively, another method that may be used involves pre-molding a pair of half-covers from the cover material by die casting or another molding method, enclosing the core in the half-covers, and compression molding at, for example, between 120° C. and 170° C. for a period of 1 to 5 minutes to attach the cover halves around the core. The core may be surface-treated before the cover is formed over it to increase the adhesion between the core and the cover. Nonlimiting examples of suitable surface preparations include mechanical or chemical abrasion, corona discharge, plasma treatment, or application of an adhesion promoter such as a silane or of an adhesive. The cover typically has a dimple pattern and profile to provide desirable aerodynamic characteristics to the golf ball.

The cover has a thickness of at least about 1 mm in various embodiments, preferably at least about 2 mm in other embodiments. In general the cover may be from about 1 mm or from about 2 mm or from about 2.5 mm thick up to about 6 mm or up to about 5 mm or up to about 4 mm thick. If there are two cover layers, typically, the cover layers may each independently have a thickness of from about 0.6 mm to about 2.0 mm, preferably from about 0.8 mm to about 1.6 mm.

In preferred embodiments, the golf ball is free from any thermoset rubber layer or other thermoset layer.

The golf balls can be of any size, although the USGA requires that golf balls used in competition have a diameter of at least 1.68 inches (42.672 mm) and a weight of no greater than 1.62 ounces (45.926 g). For play outside of USGA competition, the golf balls can have smaller diameters and be heavier.

After a golf ball has been molded, it may undergo various further processing steps such as buffing, painting and marking. In a particularly preferred embodiment of the invention, the golf ball has a dimple pattern that coverage of 65% or more of the surface. The golf ball typically is coated with a durable, abrasion-resistant and relatively non-yellowing finish coat.

The description is merely exemplary in nature and, thus, variations that do not depart from the gist of the disclosure are a part of the invention. Variations are not to be regarded as a departure from the spirit and scope of the disclosure

What is claimed is:

1. A golf ball, comprising:
   a core center having a diameter of from about 28 mm to about 35 mm and a specific gravity of up to 0.95 comprising a first thermoplastic material having a first flexural modulus of less than about 15,000 psi, wherein the core center is foamed or comprises hollow glass particles;
   a core layer disposed radially outward from the core center comprising a second thermoplastic material having a second flexural modulus of up to about 15,000 psi, wherein the second flexural modulus is greater than the first flexural modulus; and
   a cover disposed radially outward from the core layer, wherein the cover has a specific gravity of at least about 2, a third flexural modulus of at least about 15,000 psi, a thickness of at least about 2 mm, and comprises a third thermoplastic material, such that the specific gravity of the cover is at least about 1.05 greater than the specific gravity of the core center.

2. A golf ball according to claim 1, wherein the cover has a specific gravity of from about 2.0 to about 3.0.

3. A golf ball according to claim 1, wherein the specific gravity of the core center is from about 0.85 to about 0.95.

4. A golf ball according to claim 1, wherein the specific gravity of the core layer is at least about 0.1 greater than the specific gravity of the core center.

5. A golf ball according to claim 1, wherein the first flexural modulus is up to about 10,000 psi.

6. A golf ball according to claim 1, wherein the first flexural modulus is from about 3000 psi to about 6000 psi and the second flexural modulus is from about 6000 psi to about 12,000 psi.

7. A golf ball according to claim 1, wherein the third flexural modulus is at least about 35,000 psi.

8. A golf ball according to claim 1, wherein the golf ball is free from a thermoset rubber layer.

9. A golf ball, comprising:
   a core center having a diameter of from about 21 mm to about 29 mm comprising a first thermoplastic material having a first flexural modulus of less than about 15,000 psi, a specific gravity of up to 0.95, and wherein the core center is foamed or comprises hollow glass particles;
   a core layer disposed radially outward from the core center, wherein the core layer has a specific gravity of at least about 1.1 and comprises a second thermoplastic material having a second flexural modulus of up to about 15,000 psi, wherein the second flexural modulus is greater than the first flexural modulus; and
   a cover disposed radially outward from the core layer, wherein the cover has a thickness of at least about 1 mm, has a specific gravity of from about 2.0 to about 3.0, and comprises a third thermoplastic material having a third flexural modulus of at least about 15,000 psi, such that the specific gravity of the cover is at least about 1.05 greater than the specific gravity of the core center.

10. A golf ball according to claim 9, wherein the specific gravity of the core center is from about 0.85 to 0.95.

11. A golf ball according to claim 9, wherein the first flexural modulus is up to about 10,000 psi.

12. A golf ball according to claim 9, wherein the first flexural modulus is from about 3000 psi to about 6000 psi and the second flexural modulus is from about 6000 psi to about 12,000 psi.

13. A golf ball according to claim 9, wherein the third flexural modulus is at least about 35,000 psi.

14. A golf ball according to claim 9, wherein the golf ball is free from a thermoset rubber layer.

15. A golf ball according to claim 9, wherein the cover comprises a filler selected from the group consisting of metals and metal oxides.

* * * * *